United States Patent
Kung et al.

(10) Patent No.: US 9,437,155 B2
(45) Date of Patent: Sep. 6, 2016

(54) TOUCH SENSING DEVICE

(71) Applicant: Industrial Technology Research Institute, Hsinchu (TW)

(72) Inventors: Chen-Pang Kung, Taoyuan (TW); Yu-Jen Chen, Pingtung County (TW); Chen-Wei Lin, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 14/622,907

(22) Filed: Feb. 15, 2015

(65) Prior Publication Data

US 2015/0161962 A1 Jun. 11, 2015

Related U.S. Application Data

(62) Division of application No. 12/690,908, filed on Jan. 20, 2010, now Pat. No. 8,982,088.

(30) Foreign Application Priority Data

Apr. 15, 2009 (TW) .............................. 98112461 A

(51) Int. Cl.
*G06F 3/042* (2006.01)
*G09G 5/00* (2006.01)
*G06F 3/044* (2006.01)

(52) U.S. Cl.
CPC ................. *G09G 5/00* (2013.01); *G06F 3/042* (2013.01); *G06F 3/044* (2013.01); *G09G 2300/0426* (2013.01)

(58) Field of Classification Search
CPC ........... G06F 3/041–3/047; G06F 2203/04111
See application file for complete search history.

(56) References Cited

U.S. PATENT DOCUMENTS

| 7,274,424 B1* | 9/2007 | Kurihara | G02F 1/13338 345/173 |
|---|---|---|---|
| 2006/0132461 A1 | 6/2006 | Furukawa et al. | |
| 2009/0211818 A1 | 8/2009 | Kondo et al. | |
| 2009/0236151 A1* | 9/2009 | Yeh | G06F 3/0412 178/18.03 |
| 2009/0256821 A1* | 10/2009 | Mamba | G06F 3/044 345/174 |
| 2009/0303202 A1* | 12/2009 | Liu | G06F 3/044 345/174 |
| 2010/0045625 A1 | 2/2010 | Yang et al. | |

FOREIGN PATENT DOCUMENTS

| CN | 1502166 | 6/2004 |
| TW | 200620078 | 6/2006 |
| TW | 200739401 | 10/2007 |

OTHER PUBLICATIONS

"Office Action of Taiwan Counterpart Application", issued on Sep. 24, 2012, p. 1-p. 3.

(Continued)

*Primary Examiner* — Gene W Lee
(74) *Attorney, Agent, or Firm* — Jianq Chyun IP Office

(57) ABSTRACT

A touch sensing device is provided. The device includes a substrate; a plurality of first electrodes formed on the substrate and arranged along a first direction without overlapping one another; a first insulating layer formed on the substrate and covering the plurality of first electrodes; and a plurality of second electrodes formed on the first insulating layer and arranged along a second direction without overlapping one another, wherein the first direction is vertical to the second direction.

7 Claims, 18 Drawing Sheets

(56) References Cited

OTHER PUBLICATIONS

"Office Action of Taiwan Counterpart Application", issued on Jan. 18, 2013, p. 1-p. 4.
"Office Action of Taiwan Counterpart Application", issued on Oct. 23, 2014, p. 1-p. 11.
"Office Action of Taiwan Counterpart Application", issued on Apr. 22, 2015, p. 1-p. 13.
Kai-Chieh Yang et al., "Novel capacitive sensing structure for touch display," Unpublished U.S. Appl. No. 61/189,777, filed Aug. 21, 2008.

* cited by examiner

TOUCH SENSING DEVICE

CROSS REFERENCE TO RELATED APPLICATION

This is a divisional application of and claims the priority benefit of U.S. application Ser. No. 12/690,908, filed on Jan. 20, 2010, now allowed. The prior U.S. application Ser. No. 12/690,908 claims the priority benefit of Taiwan application serial no. 98112461, filed on Apr. 15, 2009. The entirety of each of the above-mentioned patent applications is hereby incorporated by reference herein and made a part of this specification.

BACKGROUND

1. Technique Field

The disclosure relates to a touch sensing device.

2. Description of the Related Art

The conventional capacitive touch sensing display is formed by externally bonding one or two touch sensing panels to a display panel. The substrate material of the touch sensing panels may be a patterned ITO 0.7 mm or 0.5 mm glass, or a single layer patterned 175 um or 150 um PET/ITO substrate. While the glass substrate is formed at higher temperatures, beneficial for forming low resistance ITO electrode for fabrication of a stacked structure and large area manufacturing, the fabricated glass substrate is not flexible and has low capacitance sensitivity due to the thickness of the glass substrate, hindering applicability. Meanwhile, the PET/ITO substrate is formed at lower temperatures, forming high resistance ITO electrodes, hindering fabrication of a stacked structure and large area manufacturing.

U.S. Pat. No. 7,109,978 discloses a sense plane. The sense plane includes a touch sensor array 22, wherein top, bottom, composite and cross-sectional views are respectively shown in FIG. 1A-1D. The touch sensor array 22 includes a substrate 24 having a first set of conductive traces 26 disposed on a top surface 28 thereof and in a first direction to comprise row positions of the touch sensor array 22. A second set of conductive traces 30 are disposed on a bottom surface 32 thereof and in a second direction orthogonal to the first direction to form the column positions of the touch sensor array 22. The first and second set of conductive traces 26 and 30 alternately contact with the sense pads 34. An insulating layer 36 is disposed over the sense pads 34 on top surface 28 to insulate a human finger or other object therefrom. The substrate disclosed in the U.S. Pat. No. 7,109,978 may be a Print Circuit Board (PCB) or a flexible PCB or any other useable circuit connection structure. The insulating layer 36 is a thin layer (i.e., Mylar). Therefore, in the manufacturing of the sense panel and the display panel, an assembly process for externally bonding is needed.

Thus, it provides a touch sensing device, formed with low resistance ITO electrodes, having high capacitance sensitivity, flexibility and no external bonding assembly process.

SUMMARY

A detailed description is given in the following embodiments with reference to the accompanying drawings.

In one embodiment, the present invention provides a touch sensing device. The touch sensing device includes: a non-conductor soft or hard substrate, or a soft or hard compound substrate comprising gas-water-proof material, anti-reflection optical material, electrode-adhesion-enhanced material, planarization material, or scrape-proof material; a plurality of first electrodes foil led on the substrate and arranged along a first direction without overlapping one another; a first insulating layer formed on the substrate and covering the plurality of first electrodes; and a plurality of second electrodes formed on the first insulating layer and arranged along a second direction without overlapping one another, wherein the first direction is orthogonal to the second direction. An isolating layer is formed on the second electrodes to improve waterproofing, optical, planarization or anti-interference performance.

In another embodiment, the present invention provides a touch sensing device. The touch sensing device includes: a non-conductor soft or hard substrate, or a soft or hard compound substrate comprising gas-water-proof material, anti-reflection optical material, electrode-adhesion-enhanced material, planarization material, or scrape-proof material; a plurality of first electrodes and a plurality of second electrodes formed on the substrate and arranged along a first direction and a second direction without overlapping one another; a first insulating layer formed on the substrate and covering the plurality of first electrodes and second electrodes, and a plurality of cavities are formed on the first insulating layer; a wire layer comprising a plurality of wires formed on the first insulating layer, and the first electrodes are connected by the plurality of wires, wherein the first direction is orthogonal to the second direction. An isolating layer is formed on the wire layer to improve waterproofing, optical, planarization or anti-interference performance.

In another embodiment, the present invention provides a touch sensing device. The touch sensing device includes: a soft or hard substrate, or a soft or hard compound substrate comprising gas-water-proof material, anti-reflection optical material, electrode-adhesion-enhanced material, planarization material, or scrape-proof material; a plurality of first electrodes formed on the substrate and arranged along a first direction without overlapping one another; and a first insulating layer formed on the substrate and covering the plurality of first electrodes; a plurality of second electrodes formed on the first insulating layer and arranged along a second direction without overlapping one another; a preventing layer formed on the first insulating layer and covering the second electrodes, wherein the first direction is orthogonal to the second direction. An isolating layer is formed under the isolating layer to improve waterproof, optical, planarization or anti-interference performance.

In another embodiment, the present invention provides a structure of a touch sensing device. The touch sensing device includes: a soft or hard substrate, or a soft or hard compound substrate comprising gas-water-proof material, anti-reflection optical material, electrode-adhesion-enhanced material, planarization material, or scrape-proof material; a wire layer comprising a plurality of wires formed on the substrate; a first insulating layer formed on the wire layer and a plurality of cavities are formed in the first insulating layer; a plurality of first electrodes and a plurality of second electrodes formed on the substrate and arranged along a first direction and a second direction without overlapping one another, and the first electrodes are connected by the plurality of wires via the plurality of cavities; and a preventing layer formed on the first insulating layer and covering the plurality of first electrodes and the second electrodes, wherein the first direction is orthogonal to the second direction. An isolating layer is formed between the wire layer and the substrate to improve waterproofing, optical, planarization or anti-interference performance.

BRIEF DESCRIPTION OF DRAWINGS

Embodiment can be more fully understood by reading the subsequent detailed description and examples with references made to the accompanying drawings, wherein.

DETAILED DESCRIPTION

Figure 1A:
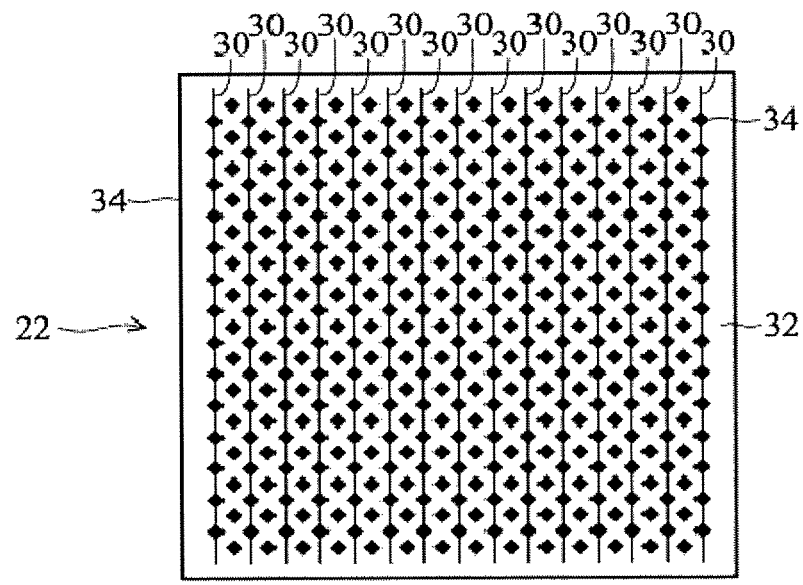
FIG. 1A is a top view of a conventional touch sensing device.
Figure 1B:
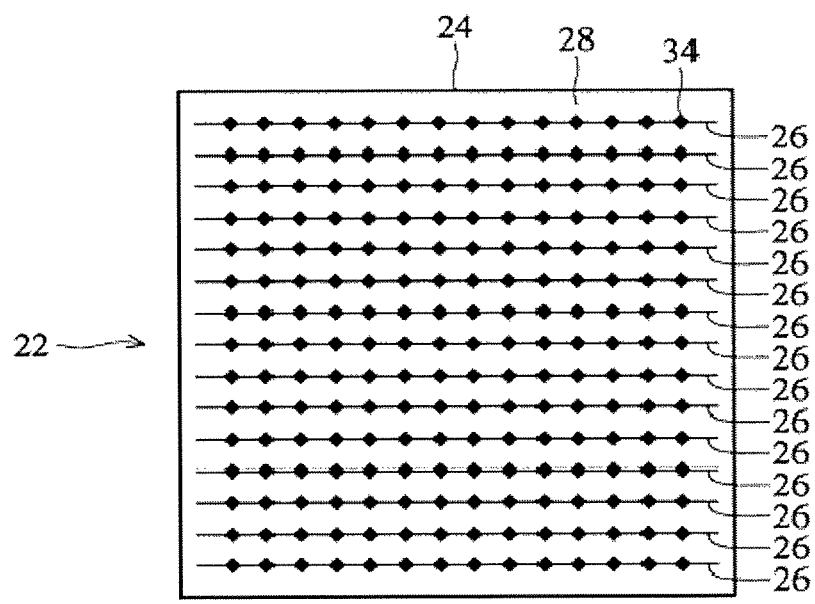
FIG. 1B is a bottom view of a conventional touch sensing device.
Figure 1C:
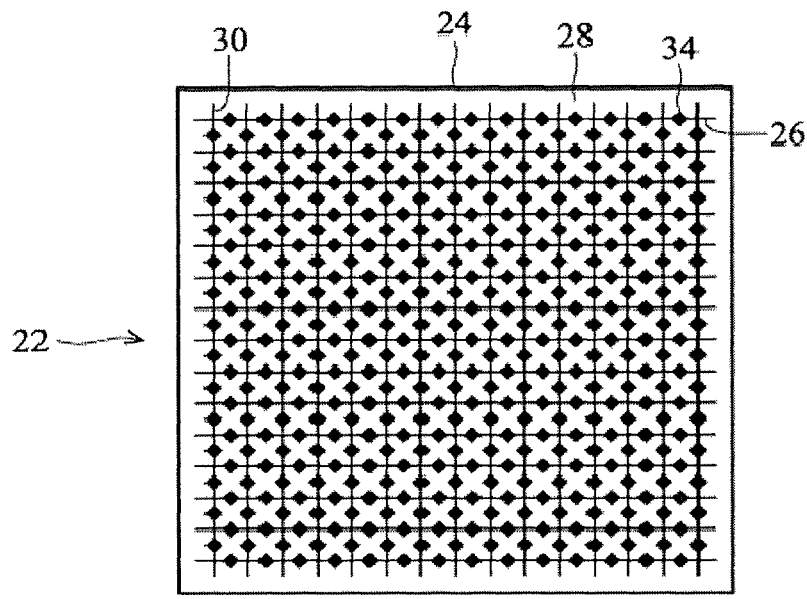
FIG. 1C is a composite view of a conventional touch sensing device.
Figure 1D:
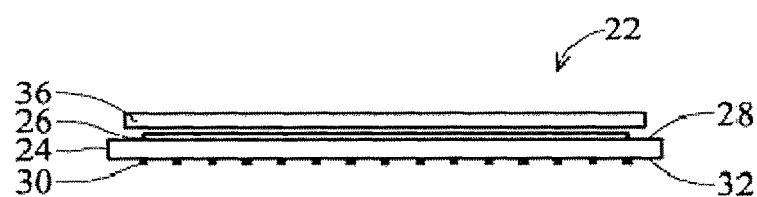
FIG. 1D is a cross-sectional view of a conventional touch sensing device.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
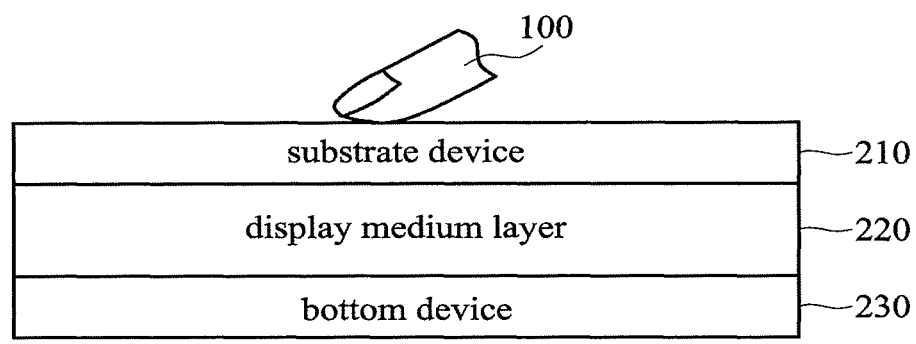
FIG. 2 is a diagram showing a display device.

FIG. 2 is a diagram showing a display device which includes a substrate device 210, a display medium 220 and a bottom device 230. Generally, a touch sensing panel (not showed) is externally bonded to the substrate device 210 and executed by conductors or fingers.

Figure 3:
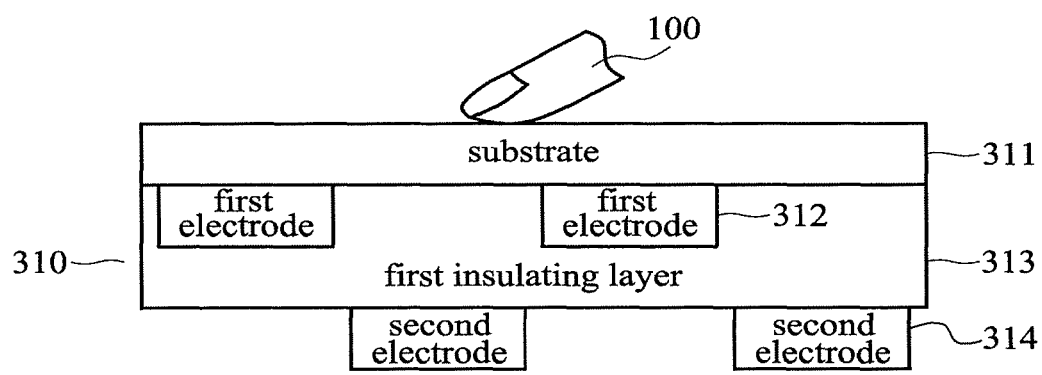
FIG. 3 is a diagram showing a touch sensing device of an embodiment.

FIG. 3 is a diagram showing a touch sensing device of an embodiment of the invention. The touch sensing device 310 includes a substrate 311, a plurality of first electrodes 312, a first insulating layer 313 and a plurality of second electrodes 314.

The touch sensing device 310 includes the substrate 311 such as glass or plastics (PET-polyethylene terephthalate, PI, PES etc.) or functional material such as organic matter (e.g., $SiO_2$, SiNx, etc) or an inorganic matter (Parylene) material stack which are used to increase hardness, water-tolerance, transmittance, and rub-proofing. The plurality of first electrodes 312 which are separated within an interval are formed on the substrate 311 and arranged along a first direction (e.g., x axial) in 2D space. The first electrodes 312 which are connected to one another by conductive wires (not showed) are used to sense total capacitance variation according to the conductor 100 (or a finger) indirectly touches the first electrodes 312 in the x axial. The first insulating layer 313 comprising material such as SiO2 or SiNx is formed on the substrate 311 and covers the plurality of first electrodes 312. The plurality of second electrodes 314 such as transparent electrodes (e.g., ITO, AZO, IZO etc.) are formed on the first insulating layer 313. The plurality of second electrodes 314 are separated within an interval and arranged along a second direction (e.g., y axial) in 2D space. The second electrodes 314 which are connected to one another by conductive wires (not showed) are used to sense total capacitance variation according to the conductor 100 (or a finger) indirectly touches the first electrodes 312 in the y axial. The touch sensing device 310 can be a substrate base of a substrate device 210 in a display device. A color filter or co-plane electrodes can be added. The touch sensing device 310 also can be a substrate base of a bottom device 230 in the display device. Film transistors or co-plane electrodes can be added. The sequential processes are well known by those who are skilled in the art, so it's not detailed herein.

Figure 4:
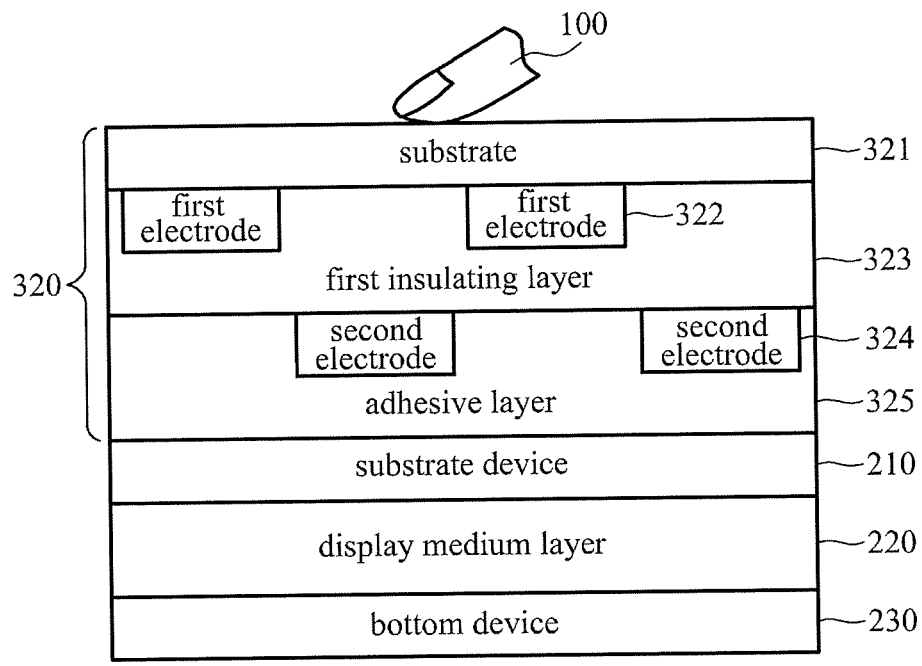
FIG. 4 is a diagram showing a touch sensitive display device of an embodiment.

In another embodiment, as shown in FIG. 4, a touch sensing device 320 includes a substrate 321, a plurality of first electrodes 322, a first insulating layer 323, a plurality of second electrodes 324 and an adhesive layer 325.

The difference between the foregoing touch sensing device 310 and the touch sensing device 320 is the adhesive layer 325. The touch sensing device 320 can be externally bonded to the substrate device 210 in the display device through the adhesive layer 325 which may be an OCA tape.

Figure 5:
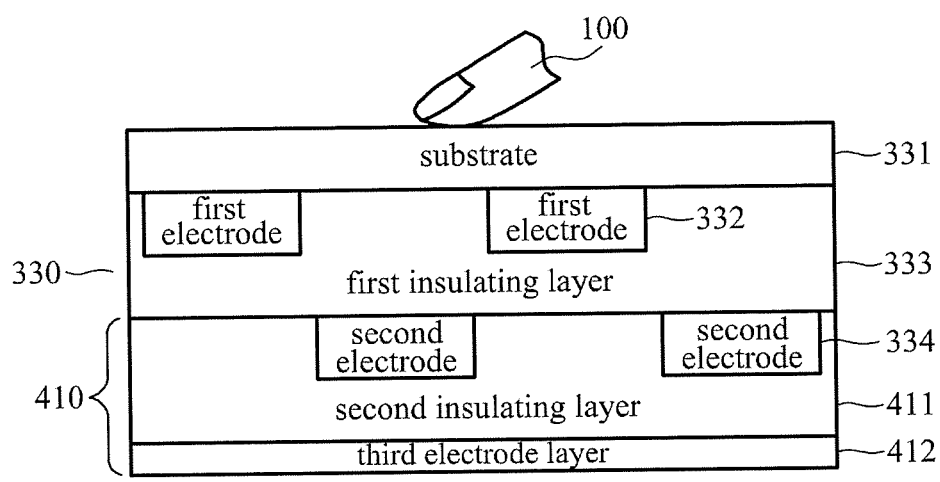
FIG. 5 is a diagram showing a touch sensing device of another embodiment.

In another embodiment, as shown in FIG. 5, a touch sensing device 330 includes a substrate 331, a plurality of first electrodes 332, a first insulating layer 333, a plurality of second electrodes 334 and an isolating layer 410. The difference between the foregoing touch sensing device 310 and the touch sensing device 330 is the isolating layer 410 having an insulating layer 411 and a third electrode layer 412. The second insulating layer 411 is formed on the second electrodes 334 and the third electrode layer 412 is formed on the second insulating layer 411. The second insulating layer 411 may be SiNx, SiO2, photo-resistor, plastics etc. The third electrode layer 412 may be a transparent conductor such as an ITO, IZO, AZO etc. The isolating layer 410 is used to prevent interference from the display terminal. The touch sensing device 330 can be a substrate base of the substrate device 210 in a display. For an LCD as an example, a color filter and co-planar electrode process would be performed on the substrate device 210. The display medium layer 220 would be liquid crystal and the bottom device 230 would be a film transistor substrate.

Figure 6:
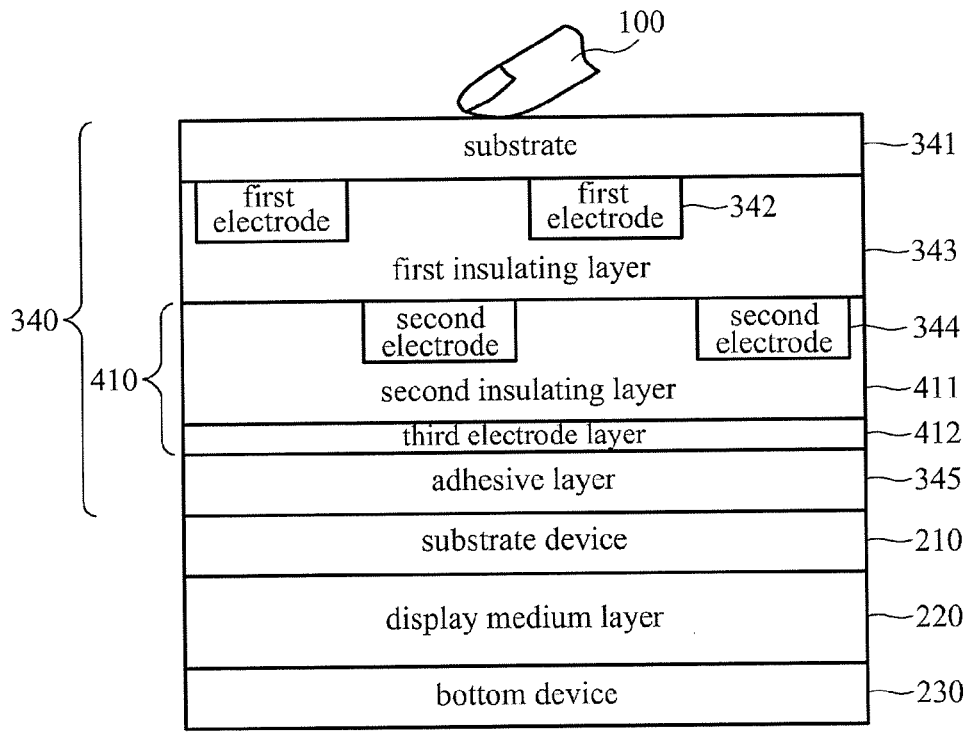
FIG. 6 is a diagram showing a touch sensitive display device of another embodiment.

The touch sensing device 340 as shown in FIG. 6 includes a substrate 341, a plurality of first electrodes 342, a first insulating layer 343, a plurality of second electrodes 344, an adhesive layer 345 and an isolating layer 410 having a second insulating layer 411 and a third electrode layer 412. The touch sensing device 340 can be bonded to the substrate device 210 through the adhesive layer 345.

Figure 7:
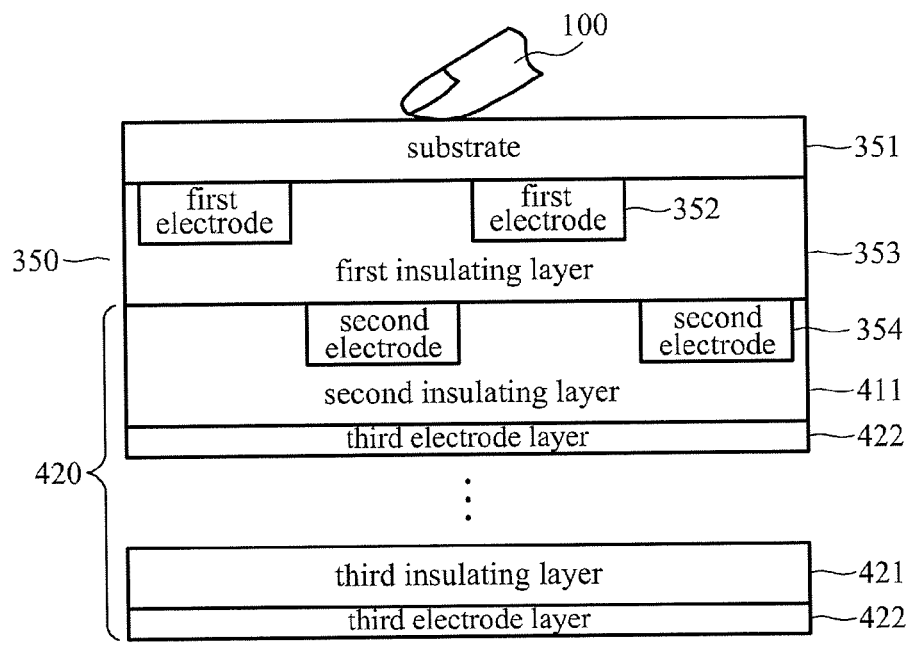
FIG. 7 is a diagram showing a touch sensing device of another embodiment.

In another embodiment as shown in FIG. 7, the touch sensing device 350 has a compound isolating layer consisting of a plurality of insulating layers and a plurality of electrode layers for raising interference-proofing, water-proofing and optical performance. For example, the touch sensing device 350 has a compound isolating layer 420 consisting of the second insulating layer 411, a plurality of third insulating layers 421 and a plurality of third electrode layers 422 for raising interference-proofing, water-proofing and optical performance. The third electrode layers 422 and the third insulating layers 421 are stacked alternately on the second insulating layer 411. The touch sensing device 350 can be a substrate base of the substrate device 210 in a display.

Figure 8:
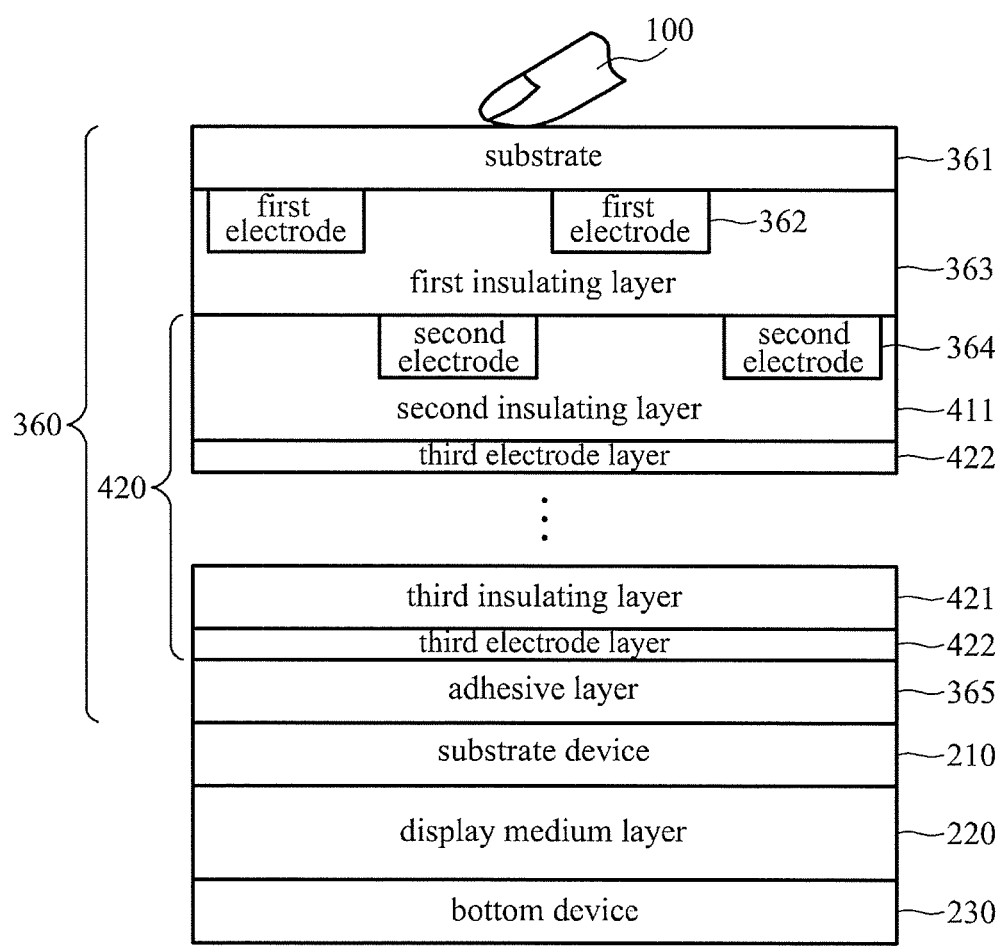
FIG. 8 is a diagram showing a touch sensitive display device of another embodiment.

The touch sensing device 360 further includes an adhesive layer 365 as shown in FIG. 8. The touch sensing device 360 can be bonded to the substrate device 210 through the adhesive layer 365 as shown in FIG. 8 to form a touch sensitive display device.

Figure 9:
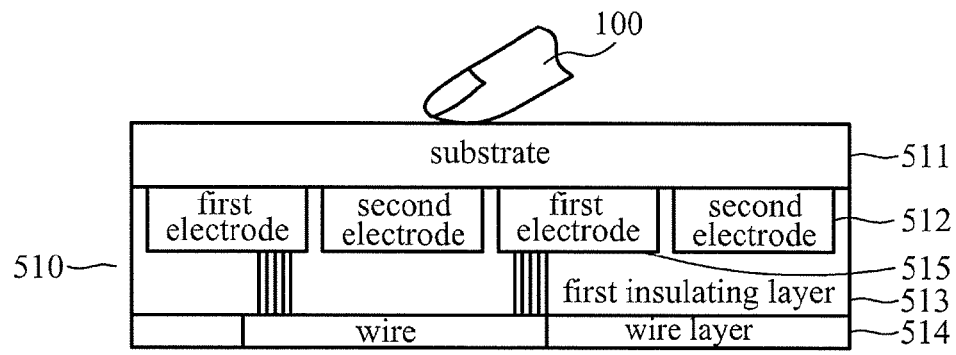
FIG. 9 is a diagram showing a touch sensing device of another embodiment.

In another embodiment as shown in FIG. 9, the touch sensing device 510 includes a substrate 511 such as glass or plastics (PET-polyethylene terephthalate, PI, PES etc.) or functional material such as organic matter (e.g., $SiO_2$, SiNx, etc) or an inorganic matter (Parylene) material stack which are used to increase hardness, water-tolerance, transmittance, and rub-proofing. A plurality of first electrodes 515 and a plurality of second 512 are formed on the substrate 511 and arranged along a first direction and a second direction without overlapping one another. The plurality of first electrodes and second electrodes are respectively along the first direction x axial and the second direction y axial formed on the surface of the substrate 511 and the electrodes are separated within an interval. The first electrodes 515 and the second electrodes 512 (e.g., ITO, IZO, AZO etc) are formed on the substrate 511 with a sputter method. The second electrodes 512 are connected by conductive wires (not showed) to sense total capacitance variation along a y axial according to the conductor 100 (or a finger) indirectly touches the first electrodes 312. A patterned first insulating layer 513 comprising material such as SiO2, SiNx or other organic matter is manufactured by evaporation or other film processes to be formed on the substrate 511 and cover the plurality of first electrodes 515 and second electrodes 512. Furthermore, a plurality of cavities as passages are formed inside the first insulating layer 513. A wire layer 514 having a plurality of wires is formed by a film process, wherein the first electrodes 515 are connected by the wires through the cavities and the wire layer 514. Wire material may be transparent electrodes (e.g., ITO, IZO, AZO etc.) or metal electrodes (e.g., Ti—Al—Ti, Al, Cu, MoW etc.). The touch sensing device 510 can be a substrate base of a substrate device 210 in a display device. A color filter or co-planer electrodes can be added. The touch sensing device can also be a substrate basis of a bottom device 230 in the display device. Film transistors or co-planer electrodes can be added by manufacturing processes. The sequential processes are well known by those who are skilled in the art. So it's not detailed herein.

Figure 10:
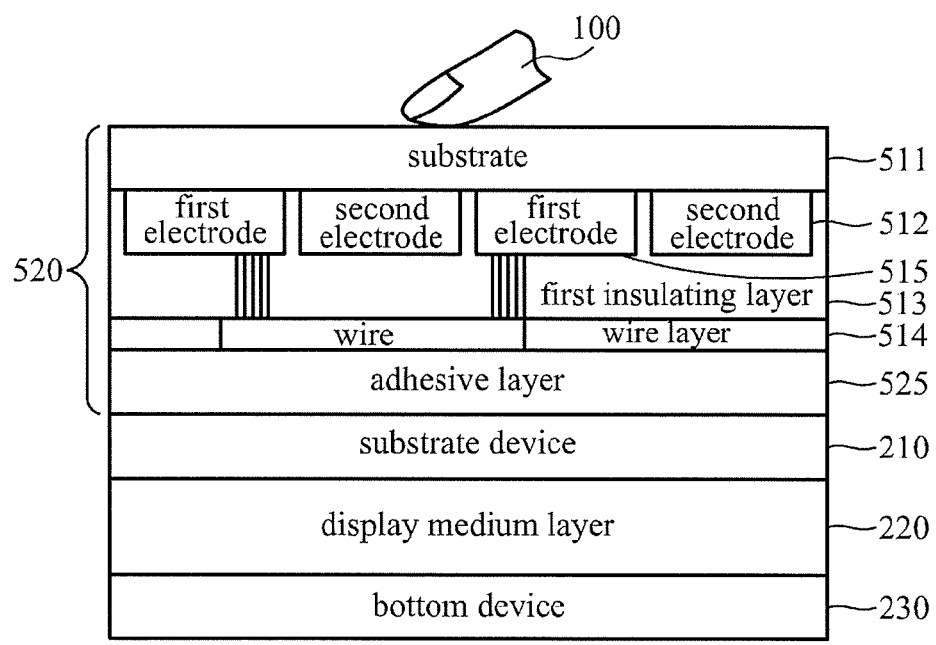
FIG. 10 is a diagram showing a touch sensitive display device of another embodiment.

In another embodiment as shown in FIG. 10, the difference between the foregoing touch sensing device 510 and the touch sensing device 520 is the adhesive layer 525. The touch sensing device 520 can be externally bonded to the substrate device 510 in the display device through the adhesive layer 525 which may be an OCA tape.

Figure 11:
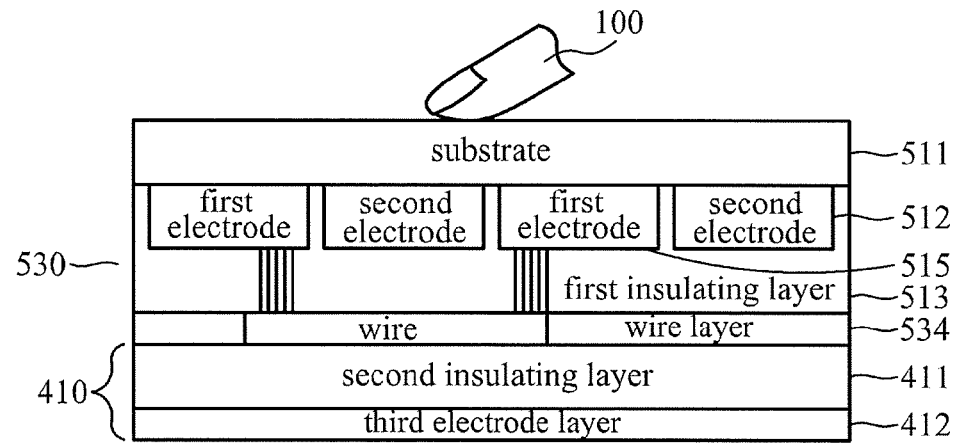
FIG. 11 is a diagram showing a touch sensing device of another embodiment.

In another embodiment, as shown in FIG. 11, the difference between the forgoing touch sensing device 510 and the touch sensing device 530 is the isolating layer 410 having a second insulating layer 411 and a third electrode layer 412. The second insulating layer 411 is formed on the wire layer 534, and the third electrode layer 412 is formed on the second insulating layer 411. The second insulating layer 411 may be SiNx, SiO2, photo-resistor, plastics etc. The third electrode layer 412 may be a transparent conductor such as ITO, IZO, AZO etc. The isolating layer 410 is used to prevent interference from the display terminal. The touch sensing device 530 can be a substrate base of the substrate device 210 in the display. For an LCD as an example, a color filter and co-planar electrode process would be performed on the substrate device 210. The display medium layer 220 would be liquid crystal. The bottom device 230 may be a film transistor substrate.

Figure 12:
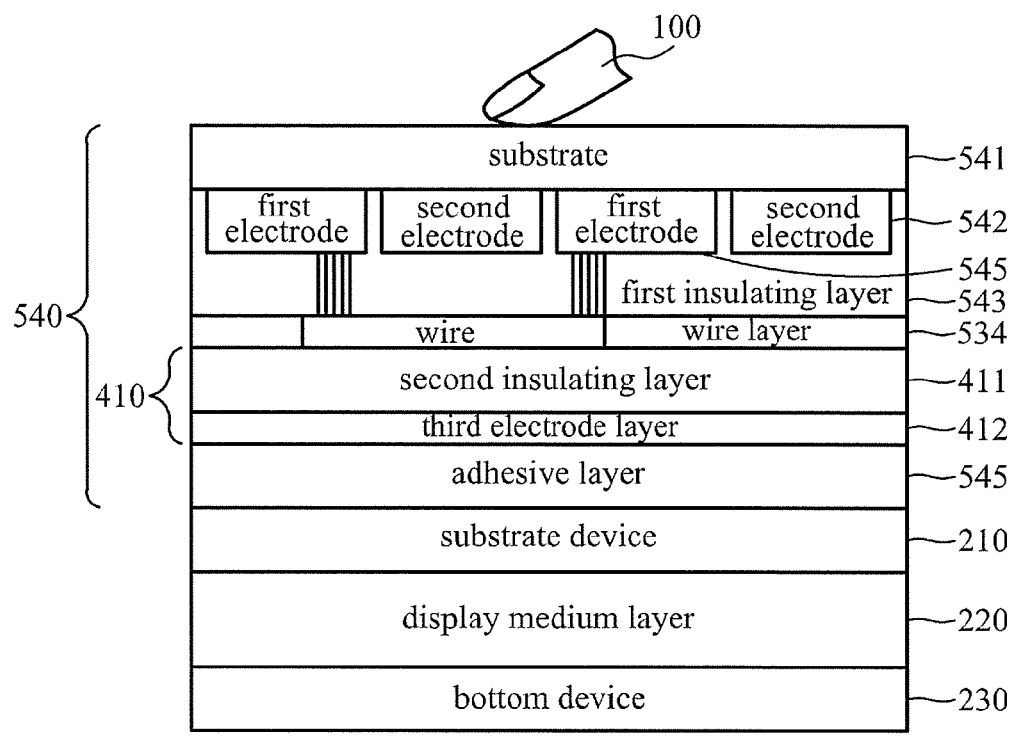
FIG. 12 is a diagram showing a touch sensitive display device of another embodiment.

The touch sensing device 540 can be bonded to the substrate device 210 as shown in FIG. 12. The touch sensing device 540 includes a substrate 541, a plurality of first electrodes 545 and a plurality of second electrodes 542 and a first insulating layer. The plurality of first electrodes 545 and the plurality of second electrodes 542 are respectively formed on the substrate 541 and arranged along a first direction x axial and a second direction y axial in 2D space. The first and second electrodes are separated with an interval. A plurality of cavities is formed inside the first insulting layer 543 as passages. The touch sensing device 530 can be bonded to the substrate device 210 through the adhesive layer 545 to form a touch sensitive display device.

Figure 13:
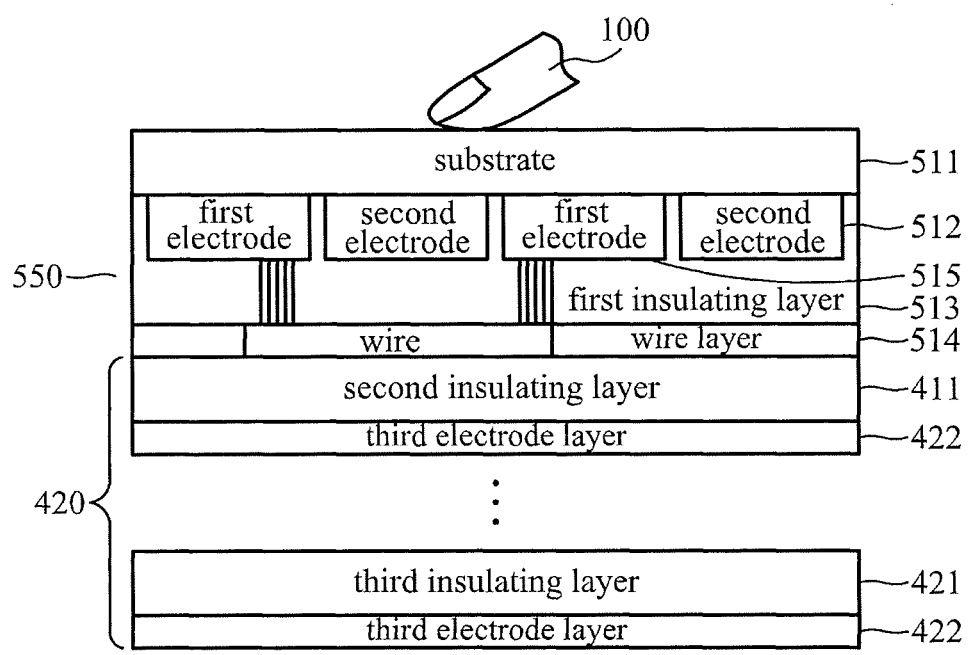
FIG. 13 is a diagram showing a touch sensing device of another embodiment.

In another embodiment as shown in FIG. 13, the touch sensing device 550 has a compound isolating layer 420 consisting of a second insulating layer 411, a plurality of third insulating layers 421 and a plurality of third electrode layers 422 for raising interference-proofing, water-proofing and optical performance. The touch sensing device 550 can be a substrate base of the substrate device 210 in the display.

Figure 14:
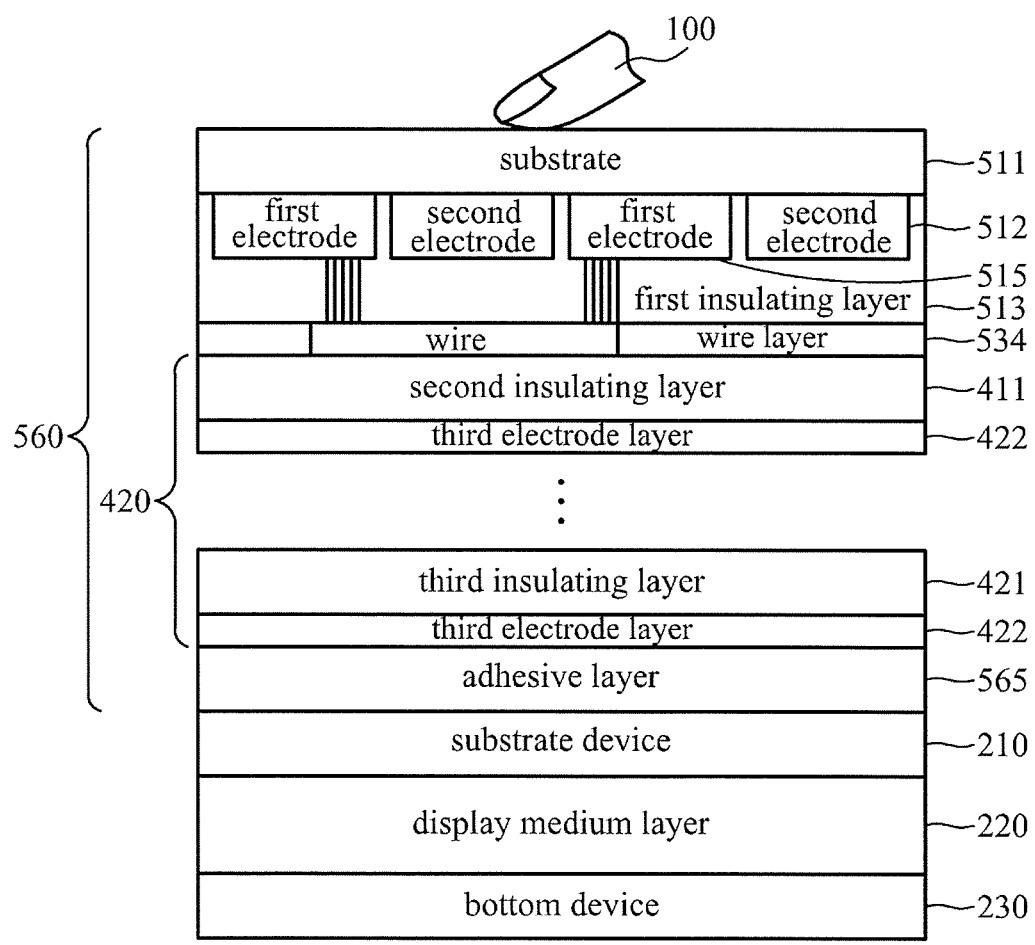
FIG. 14 is a diagram showing a touch sensitive display device of another embodiment.

The touch sensing device 560 further includes an adhesive layer 565 as shown in FIG. 14. The touch sensing device 560 can be bonded to the substrate device 210 through the adhesive layer 565 as shown in FIG. 14.

Figure 15:
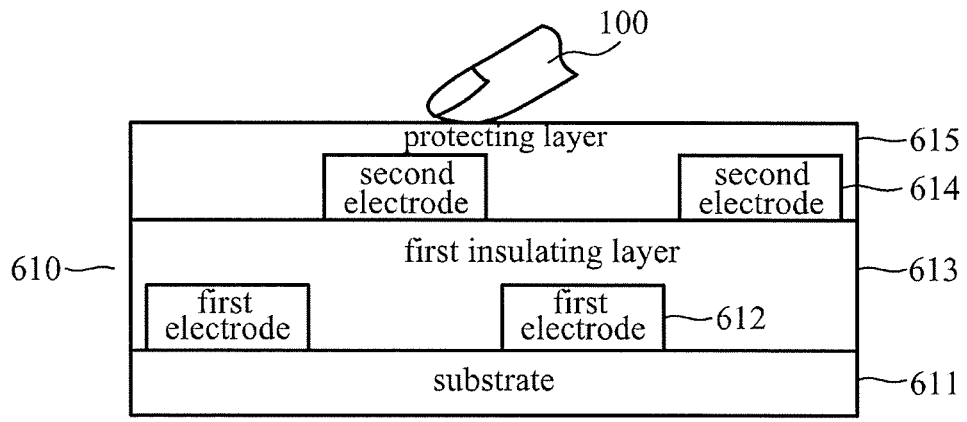
FIG. 15 is a diagram showing a touch sensing device of another embodiment.

In another embodiment as shown in FIG. 15. The touch sensing device 610 includes a soft or a hard substrate 611 such as glass or plastics (PET-polyethylene terephthalate, PI, PES etc.) or functional material such as organic matter (e.g., $SiO_2$, SiNx, etc) or an inorganic matter (Parylene) material stack which are used to increase hardness, water-tolerance, transmittance, and rub-proofing. The plurality of first electrodes 612 (e.g., ITO, AZO, IZO etc.) which are separated within an interval are formed on the substrate 611 and arranged along a first direction (e.g., x axial). The first insulating layer 613 (e.g., Parylene or SiNx, SiO$_2$) is formed on the substrate 611 with a film process (e.g., evaporation or print coating) and covers the first electrodes 612. The plurality of second electrodes 614 which are separated within an interval are formed on the first insulating layer 613 and arranged along a second direction (i.e., y axial) in 2D space. A protecting layer 615 such as a functional film such as a scrape-proof layer or anti-reflection layer or water-proof layer or gas-proof layer is coated on the first insulating layer 613 and covers the second electrodes 614. The touch sensing device 610 can be a substrate base of a substrate device 210 in a display device. A color filter or co-plane electrodes can be added. The touch sensing device also can be a substrate base of a bottom device 230 in the display device. Film transistors or co-planer electrodes can be added. The sequential processes are well known by those who are skilled in the art. So it's not detailed herein.

Figure 16:
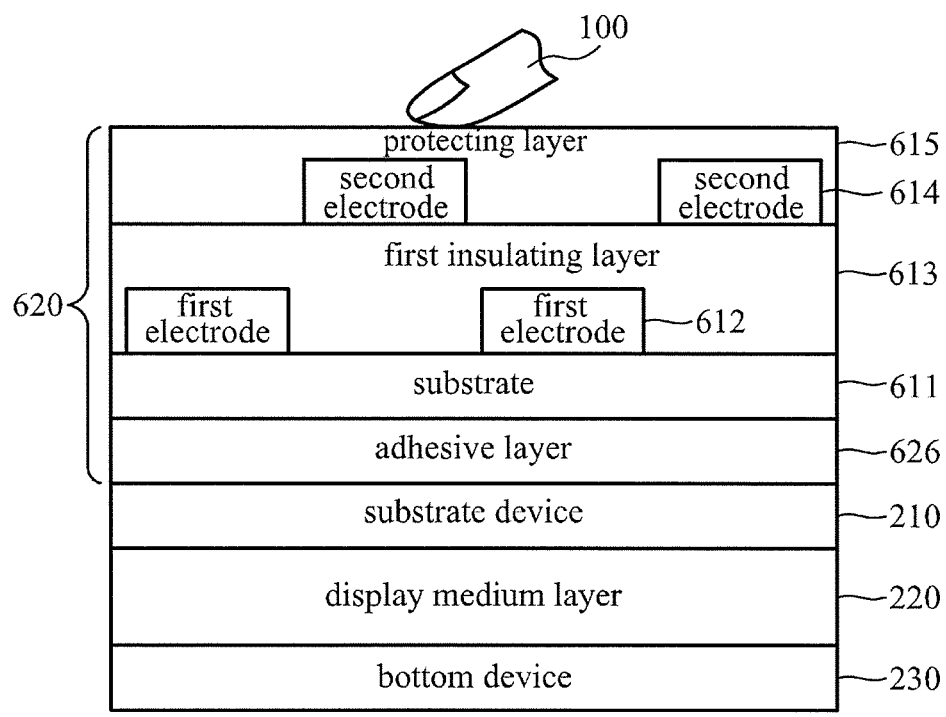
FIG. 16 is a diagram showing a touch sensitive display device of another embodiment.

In another embodiment as shown in FIG. 16, the difference between the forgoing touch sensing device 610 and the touch sensing device 620 is the adhesive layer 626. The touch sensing device 620 can be externally bonded to the substrate device 210 in the display device through the adhesive layer 626 which may be an OCA tape.

Figure 17:
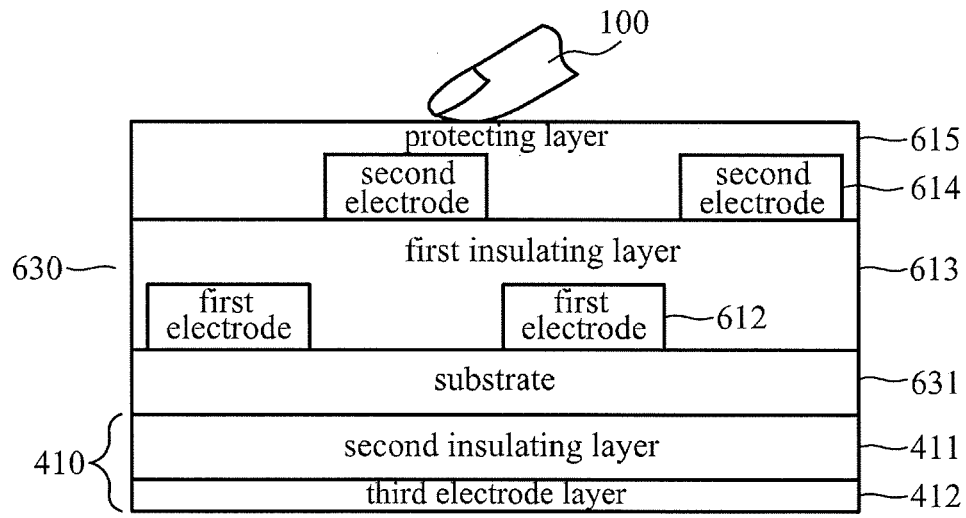
FIG. 17 is a diagram showing a touch sensing device of another embodiment.

In another embodiment as shown in FIG. 17, the difference between the forgoing touch sensing device 610 and the touch sensing device 630 is the isolating layer 410 having a second insulating layer 411 and a third electrode layer 412. The second insulating layer 411 such as organic insulating layer or inorganic layer (e.g., photoresist, plastics, Parylene, SIO$_2$, SiNx etc.) is formed on the other side of the substrate 631 by a coating process or an evaporation process. After that, the third electrode layer 412 (e.g., ITO, IZO, AZO etc.) is formed on the insulating layer 411. The touch sensing device 630 can be a substrate base of the substrate device 210 in the display. For an LCD as an example, a color filter and co-planar electrode process would be performed on the substrate device 210. The display medium layer 220 would be liquid crystal. The bottom device 230 may be film transistor substrate.

Figure 18:
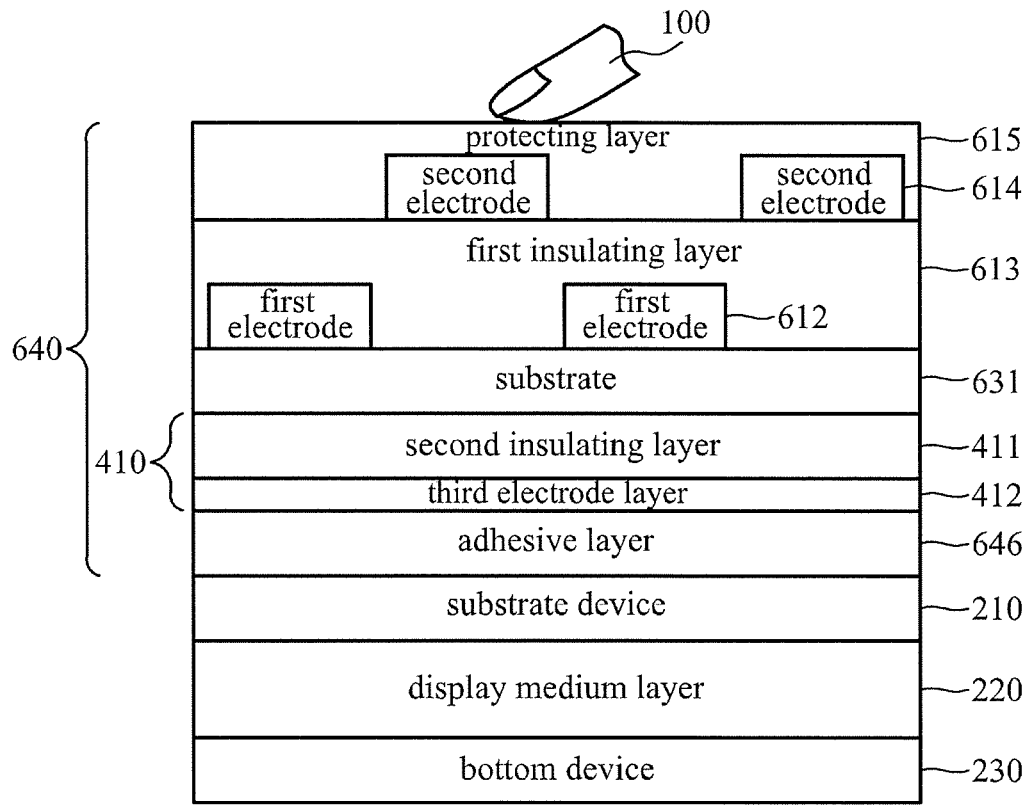
FIG. 18 is a diagram showing a touch sensitive display device of another embodiment.

The touch sensing device 640 further includes an adhesive layer 646 as shown in FIG. 18. The touch sensing device 640 can be bonded to the substrate device 210 through the adhesive layer 646 as shown in FIG. 18.

Figure 19:
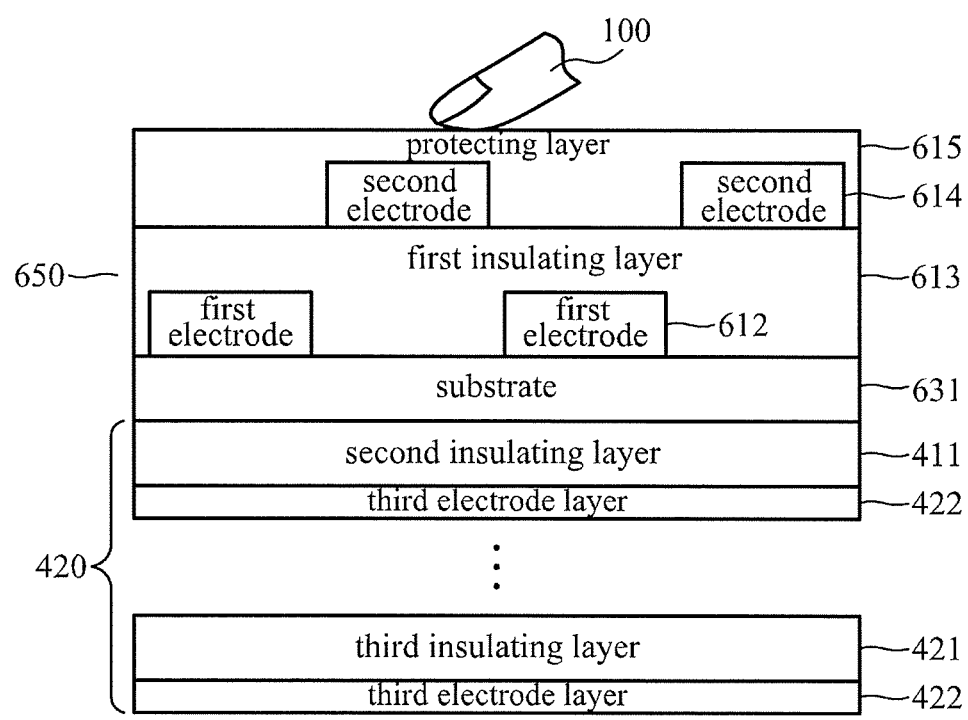
FIG. 19 is a diagram showing a touch sensing device of another embodiment.

In another embodiment as shown in FIG. 19, the touch sensing device 650 has a compound isolating layer 420 consisting of a second insulating layer 411, a plurality of third insulating layers 421 and a plurality of third electrode layers 422 for raising interference-proofing, water-proofing and optical performance. The touch sensing device 650 can be a substrate base of the substrate device 210 in the display.

Figure 20:
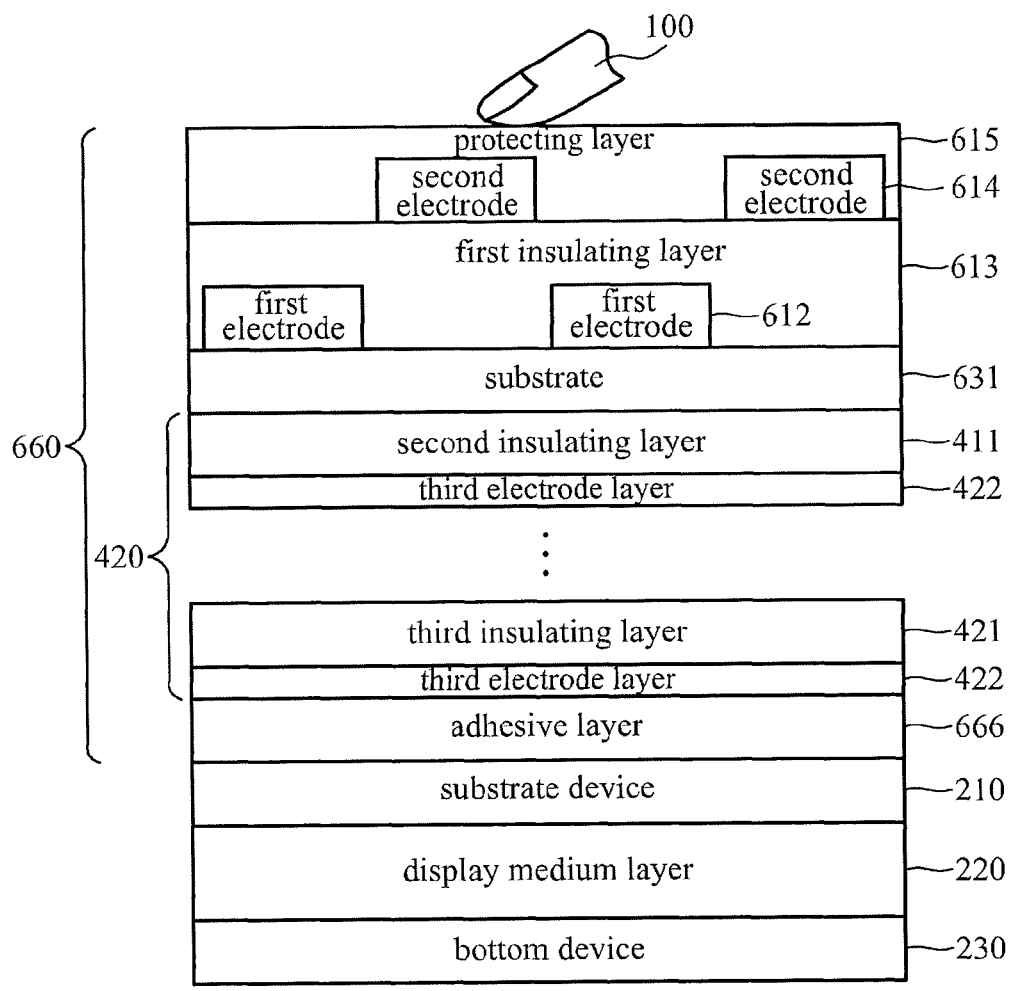
FIG. 20 is a diagram showing a touch sensitive display device of another embodiment.

The touch sensing device 660 further includes an adhesive layer 666 as shown in FIG. 20. The touch sensing device 660 can be bonded to the substrate device 210 through the adhesive layer 666 as shown in FIG. 20 to form a touch sensitive display device.

Figure 21:
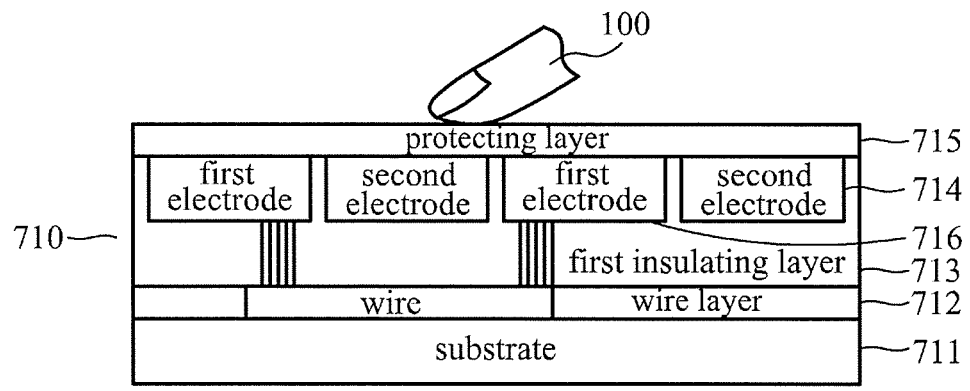
FIG. 21 is a diagram showing a touch sensing device of another embodiment.

In another embodiment as shown in FIG. 21. The touch sensing device 710 includes a soft or a hard substrate 711 such as glass or plastics (PET-polyethylene terephthalate, PI, PES etc.) or functional materials such as organic matter (e.g., SiO$_2$, SiNx, etc) or an inorganic matter (Parylene) material stack which are used to increase hardness, water-tolerance, transmittance, and rub-proofing. A wire layer 712 having conductive wires manufactured from transparent conductive oxide electrode (e.g., ITO, IZO, AZO etc.) or metal (e.g., Ti—Al—Ti, Al, MoW etc.) with sputter method is formed on the substrate 711. A first insulating layer 713 such as inorganic matter (e.g., SiNx, SiO$_2$, etc.) or organic matter (e.g., photoresist, Parylene, plastics etc.) is formed on the wire layer 712. A plurality of first electrodes 716 and second electrodes 714 (i.e., ITO, AZO, IGZO etc.) are formed on the first insulating layer 713 and arranged respectively along an x axial and a y axial. Pluralities of cavities as passages are formed inside the first insulating layer 713 by an etching or laser process. The first electrodes are connected by the wires in the wire layer 712 through the first insulating layer 713 and the cavities. A protecting layer 715 such as functional film such as a scrape-proof layer or anti-reflection layer or water-proof layer or gas-proof layer is coated on the first insulating layer 713, and covers the first electrodes 716 and the second electrodes 714. The touch sensing device 710 can be a substrate base of a substrate device 210 in a display device. A color filter or co-planer electrodes can be added. The touch sensing device can also be a substrate base of a bottom device 230 in the display device. Film transistors or co-planer electrodes can be added by manufacturing processes. The sequential processes are well known by those who are skilled in the art. So it's not detailed herein.

Figure 22:
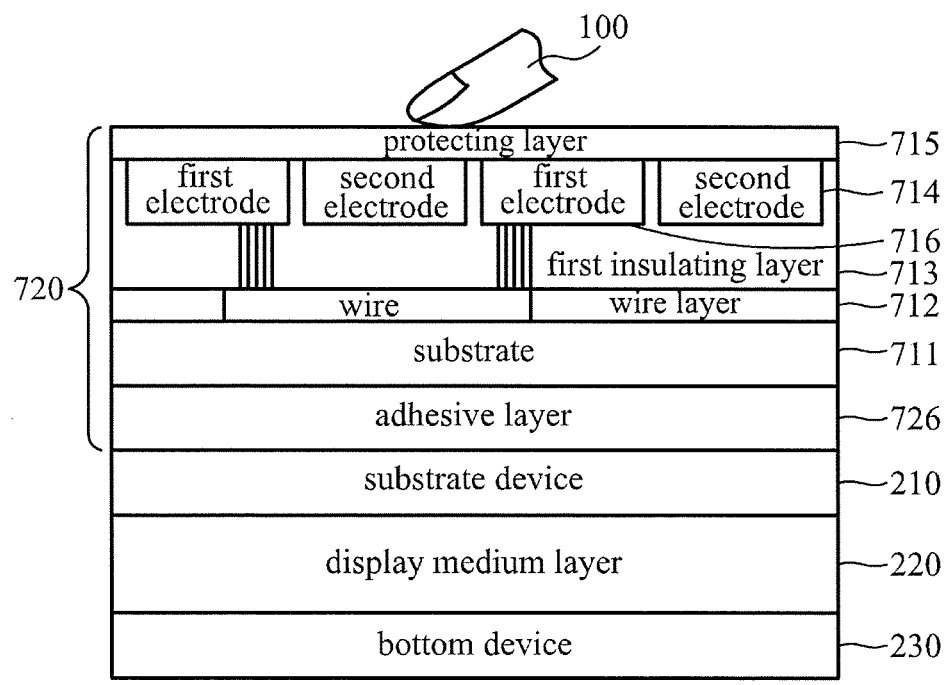
FIG. 22 is a diagram showing a touch sensitive display device of another embodiment.

In another embodiment as shown in FIG. 22, the difference between the foregoing touch sensing device 710 and the touch sensing device 720 is the adhesive layer 726. The touch sensing device 720 can be externally bonded to the substrate device 210 in the display device through the adhesive layer 726 which may be an OCA tape.

Figure 23:
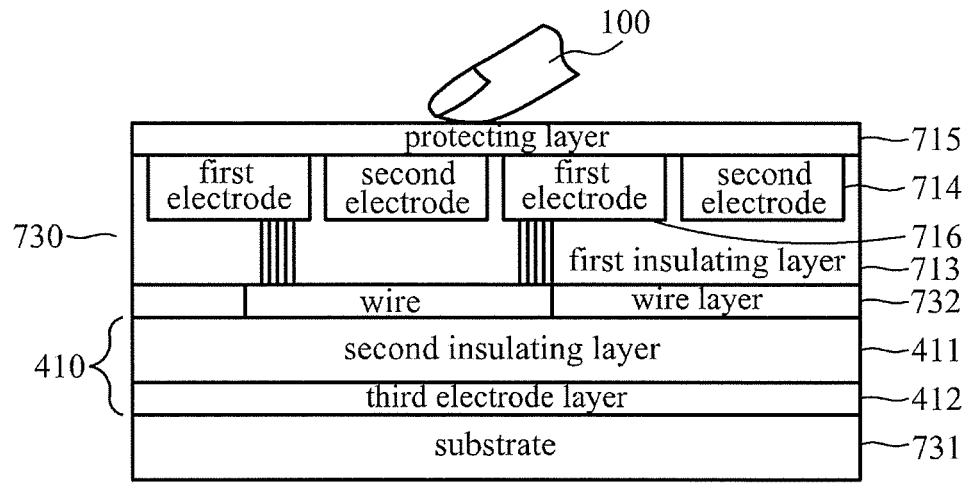
FIG. 23 is a diagram showing a touch sensing device of another embodiment.

In another embodiment, as shown in FIG. 23, the difference between the forgoing touch sensing device 710 and the touch sensing device 730 is the isolating layer 410 having a second insulating layer 411 and a third electrode layer 412. The third electrode layer 412 (e.g., ITO, IZO, AZO etc.) is firstly formed on the substrate 731. After that, the second insulating layer 411 such as organic insulating layer or inorganic layer (e.g., photoresist, plastics, Parylene, SIO$_2$, SiNx etc.) is formed on the second insulating layer 411 by a coating process or an evaporation process before the wire layer 732 is formed. The touch sensing device 730 can be a substrate base of the substrate device 210 in the display. For the LCD as an example, a color filter and co-planar electrode process would be formed on the substrate device 210. The display medium layer 220 would be liquid crystal. The bottom device 230 may be film transistor substrate.

Figure 24:
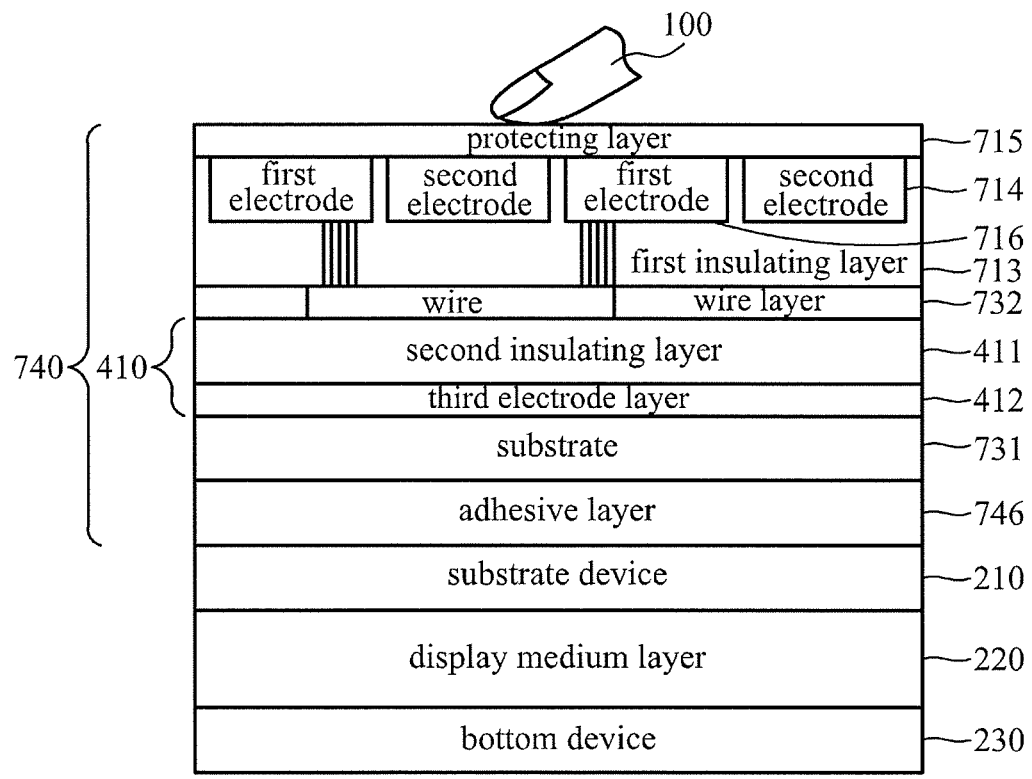
FIG. 24 is a diagram showing a touch sensitive display device of another embodiment.

The touch sensing device 740 further includes an adhesive layer 746 as shown in FIG. 24. The touch sensing device 740 can be bonded to the substrate device 210 through the adhesive layer 746 as shown in FIG. 24.

Figure 25:
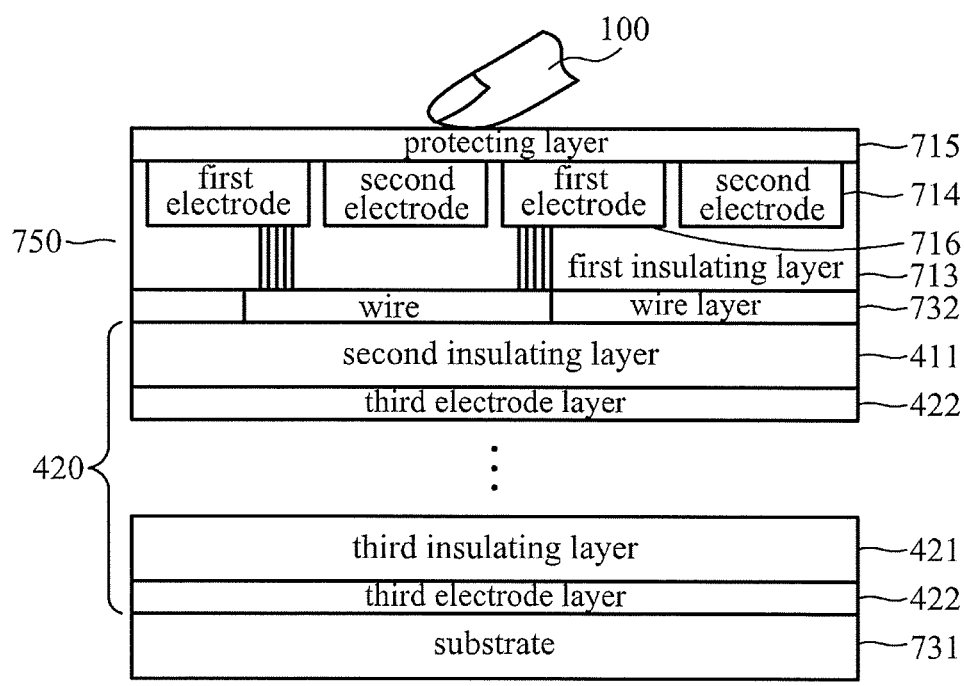
FIG. 25 is a diagram showing a touch sensing device of another embodiment.

In another embodiment as shown in FIG. 25, the touch sensing device 750 has a compound isolating layer 420 consisting of a second insulating layer 411, a plurality of third insulating layers 421 and a plurality of third electrode layers 422 for raising interference-proofing, water-proofing and optical performance. The touch sense device 750 can be a substrate base of the substrate device 210 in the display.

Figure 26:
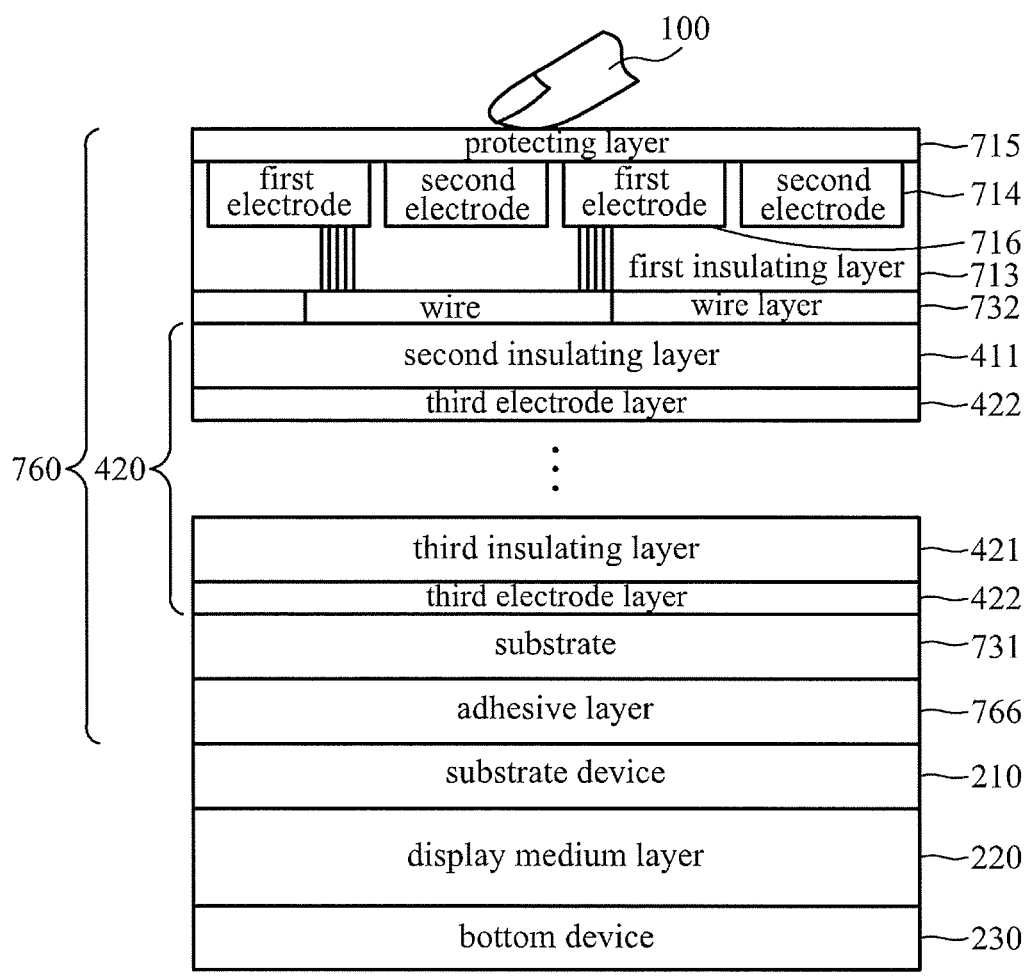
FIG. 26 is a diagram showing a touch sensitive display device of another embodiment.

The touch sensing device 760 further includes an adhesive layer 766 as shown in FIG. 26. The touch sensing device 760 can be bonded to the substrate device 210 through the adhesive layer 766 as shown in FIG. 26 to form a touch sensitive display device.

The display devices are manufactured by semiconductor process without externally bonding process to increase product stability and decrease cost. The touch sensing devices can also be assembled to electronic product display surfaces by adhesion.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A touch sensing device, comprising:
   a substrate;
   a wire layer comprising a plurality of wires formed on the substrate;
   a first insulating layer formed on the wire layer and a plurality of cavities are formed on the first insulating layer;
   a plurality of first electrodes and a plurality of second electrodes formed on the substrate and arranged along a first direction and a second direction without overlapping one another, and the first electrodes are connected by the plurality of wires via the plurality of cavities;
   a protecting layer formed on the first insulating layer and covering the plurality of first electrodes and second electrodes,
   wherein each of the first electrodes has a first top surface facing away from the substrate, a first bottom surface facing the substrate, and a first side surface connecting the first top surface and the first bottom surface, each of the second electrodes has a second top surface facing away from the substrate, a second bottom surface facing the substrate, and a second side surface connecting the second top surface and the second bottom surface, the first insulating layer covers the first bottom surface, the first side surface, the second bottom surface and the second side surface and exposes the first top surface and the second top surface, the protecting layer covers the first top surface and the second top surface;
   a material layer formed on the wire layer and comprising a second insulating layer or an adhesive layer;
   a plurality of layer pairs formed on the material layer and configured to raise interference-proofing, water-proofing and optical performance, wherein the layer pairs are formed on the material layer in sequence, and each of the layer pairs comprises a third electrode layer and a third insulating layer formed in sequence from a side adjacent to the material layer to another side away from the material layer; and
   another third electrode layer formed on the layer pairs,
   wherein the first direction is orthogonal to the second direction, the first electrodes and the second electrodes are configured to sense capacitance variation in respond to a conductor indirectly touching at least one of the first electrodes and the second electrodes.

2. The touch sensing device as claimed in claim 1, further comprising the conductor, wherein the first electrodes and the second electrodes are used to sense total capacitance variation according to the conductor indirectly touching at least one of the first electrodes and the second electrodes.

3. The touch sensing device as claimed in claim 1, wherein when the third electrode layer formed on the material layer, the material layer is the second insulating layer.

4. The touch sensing device as claimed in claim 3, wherein the second insulating layer, the layer pairs and the another third electrode layers form an isolating layer.

5. The touch sensing device as claimed in claim 4, wherein the isolating layer is located between the wire layer and the substrate.

6. The touch sensing device as claimed in claim 5, further comprising an adhesive layer formed on the substrate.

7. The touch sensing device as claimed in claim 6, wherein a display device is disposed directly on the adhesive layer of the touch sensing device.

* * * * *